(12) United States Patent
Hisano

(10) Patent No.: US 8,886,380 B2
(45) Date of Patent: Nov. 11, 2014

(54) HYBRID MOTOR VEHICLE

(71) Applicant: Taishi Hisano, Nisshin (JP)

(72) Inventor: Taishi Hisano, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 20 days.

(21) Appl. No.: 13/911,364

(22) Filed: Jun. 6, 2013

(65) Prior Publication Data

US 2013/0332017 A1 Dec. 12, 2013

(30) Foreign Application Priority Data

Jun. 12, 2012 (JP) ................................ 2012-132687

(51) Int. Cl.
| | | |
|---|---|---|
| B60L 9/00 | (2006.01) | |
| B60W 20/00 | (2006.01) | |
| B60W 10/06 | (2006.01) | |
| B60W 10/08 | (2006.01) | |
| B60W 10/26 | (2006.01) | |

(52) U.S. Cl.
CPC ............ B60W 20/106 (2013.01); B60W 10/06 (2013.01); B60W 10/08 (2013.01); *B60W 2600/00* (2013.01); *Y10S 903/93* (2013.01); *B60W 10/26* (2013.01); *Y02T 10/7077* (2013.01); *Y02T 10/6286* (2013.01); *B60W 2510/248* (2013.01); *B60W 2520/10* (2013.01); *B60W 2540/10* (2013.01); B60W 20/40 (2013.01); *Y10S 903/903* (2013.01)
USPC .......... 701/22; 903/903; 903/930; 180/65.265

(58) Field of Classification Search
CPC .............. Y10S 903/903; Y02T 90/127; Y02T 10/7005; Y02T 10/7077; B60W 10/26; B60W 20/06

USPC ................. 701/22; 903/903, 930; 320/132; 180/65.23, 65.265
See application file for complete search history.

(56) References Cited

U.S. PATENT DOCUMENTS

| | | | | |
|---|---|---|---|---|
| 5,710,699 | A * | 1/1998 | King et al. ................ | 363/132 |
| 5,969,624 | A * | 10/1999 | Sakai et al. ............... | 340/636.1 |
| 6,608,396 | B2 * | 8/2003 | Downer et al. ........... | 290/40 C |
| 2009/0145675 | A1 | 6/2009 | Ichikawa | |
| 2009/0204314 | A1 | 8/2009 | Aoki et al. | |
| 2010/0071975 | A1 | 3/2010 | Aoki | |

FOREIGN PATENT DOCUMENTS

| | | |
|---|---|---|
| JP | A-8-214469 | 8/1996 |
| JP | A-2001-157369 | 6/2001 |
| JP | A-2003-143703 | 5/2003 |
| JP | A-2006-170128 | 6/2006 |

(Continued)

*Primary Examiner* — Gertrude Arthur Jeanglaude
(74) *Attorney, Agent, or Firm* — Oliff PLC

(57) ABSTRACT

A hybrid motor vehicle includes a controller configured to: control an engine and a motor so that when power required of the vehicle increases to or above a first threshold value during stop of the engine, the engine outputs the required power until the required power decreases to or below a second threshold value that is smaller than the first threshold value; control the engine and the motor so that when the required power decreases to or below the second threshold value during operation of the engine, the engine is in a stopped state until the required power increases to or above the first threshold value; and set the second threshold value so that the second threshold value is smaller when degree of degradation of the battery exceeds a threshold value than when the degree of degradation of the batter is less than or equal to the threshold value.

7 Claims, 10 Drawing Sheets

(56) References Cited

FOREIGN PATENT DOCUMENTS

| JP | A-2007-131103 | 5/2007 |
|----|---------------|--------|
| JP | A-2008-5657 | 1/2008 |
| JP | A-2009-190522 | 8/2009 |
| JP | A-2010-70118 | 4/2010 |
| JP | A-2010-163061 | 7/2010 |
| JP | A-2011-245969 | 12/2011 |

* cited by examiner

HYBRID MOTOR VEHICLE

INCORPORATION BY REFERENCE

The disclosure of Japanese Patent Application No. 2012-132687 filed on Jun. 12, 2012 including the specification, drawings and abstract is incorporated herein by reference in its entirety.

BACKGROUND OF THE INVENTION

1. Field of the Invention

The invention relates to a hybrid motor vehicle. More specifically, the invention relates to a hybrid motor vehicle that includes an engine that outputs motive power for running the vehicle, an electric motor that takes in and outputs motive power for running the vehicle, and a battery that gives electric power to and receives electric power from the electric motor.

2. Description of Related Art

This type of hybrid motor vehicle usually is equipped with an engine, a first electric motor, a power distribution integration mechanism of which a ring gear, a carrier and a sun gear are connected to a drive shaft linked to an axle, an output shaft of the engine and a rotating shaft of the first electric motor, a second electric motor whose rotating shaft is connected to the drive shaft, and a battery that gives electric power to and receives electric power from the first electric motor and the second electric motor. In a related-art hybrid motor vehicle, if during stop of operation of the engine, the required power of the vehicle based on required torque of the drive shaft becomes increases to or above a first threshold value, the engine and the first and second electric motors are controlled so that the required torque is output to the drive shaft while the required power is output from the engine until the required power decreases to or below a second threshold value that is smaller than the first threshold value, and if during operation of the engine, the required power decreases to or below the second threshold value, the engine, the first electric motor and the second electric motor are controlled so that the required torque is output to the drive shaft while the engine is in a stopped state, until the required power increase to or above the first threshold value (see, e.g., Japanese Patent Application Publication No. 2007-131103 (JP 2007-131103 A)). In this hybrid motor vehicle, by setting as a first threshold value a value close to a lower-limit value at which the engine can be comparatively efficiently operated, intermittent operation of the engine is executed so as to achieve good efficiency of the vehicle as a whole.

In this hybrid motor vehicle, the magnitude of the charge/discharge electric power of the battery is likely to be greater when the engine and the first and second electric motors are controlled so that the required torque is output to the drive shaft while operation of the engine is in a stopped state than when the engine and the first and second electric motors are controlled so that the required torque is output to the drive shaft while the engine is outputting the required power. If the battery is charged or discharged with great electric power when the battery has degraded to a certain degree, there is a risk of further progress of the degradation of the battery, although this problem does not occur when the battery has not degraded.

SUMMARY OF THE INVENTION

The hybrid motor vehicle of the invention restrains progress of degradation of the battery.

A hybrid motor vehicle in accordance with an aspect of the invention includes: an engine configured to output motive power for running the hybrid motor vehicle; an electric motor configured to take in and output motive power for running the hybrid motor vehicle; a battery configured to give electric power to and receive electric power from the electric motor; and a controller configured to: control the engine and the electric motor so that when a required power required of the hybrid motor vehicle based on required torque needed to run the hybrid motor vehicle increases to or above a first threshold value during stop of operation of the engine, the hybrid motor vehicle runs by the required torque while the engine outputs the required power, until the required power decreases to or below a second threshold value that is smaller than the first threshold value; control the engine and the electric motor so that when the required power decreases to or below the second threshold value during operation of the engine, the hybrid motor vehicle runs by the required torque while the engine is in a stopped state, until the required power increases to or above the first threshold value; and set the second threshold value so that the second threshold value is smaller when degree of degradation of the battery exceeds a threshold value than when the degree of degradation of the battery is less than or equal to the threshold value.

In this hybrid motor vehicle, the controller sets the second threshold value so that the second threshold value is smaller when the degree of degradation of the battery exceeds the threshold value than when the degree of degradation of the battery is less than or equal to the threshold value. Due to this, when the degree of degradation of the battery exceeds the threshold value, the engine is less likely to be stopped during operation of the engine than when the degree of degradation of the battery is less than or equal to the threshold value. Therefore, the battery can be restrained from being charged or discharged with large electric power. As a result, progress of degradation of the battery can be restrained.

In this hybrid motor vehicle, the controller may set the second threshold value so that the second threshold value is smaller as the degree of degradation of the battery is greater above the threshold value. With this arrangement, the progress of degradation of the battery can be more properly restrained.

In this hybrid motor vehicle, the controller may set the first threshold value so that the first threshold value is smaller when the degree of degradation of the battery exceeds the threshold value than when the degree of degradation of the battery is less than or equal to the threshold value. In this case, the first threshold value may be set so as to be smaller as the degree of degradation of the battery is greater above the threshold value. With this arrangement, the progress of degradation of the battery can be more properly restrained.

Furthermore, in this hybrid motor vehicle, the controller may set the required power based on the required torque and on charge/discharge required power of the battery, and may set the charge/discharge required power so that the charge/discharge required power is smaller in absolute value when the degree of degradation of the battery exceeds the threshold value than when the degree of degradation of the battery is less than or equal to the threshold value. With this arrangement, the progress of degradation of the battery can be more properly restrained.

Alternatively, in this hybrid motor vehicle, the controller may compute the degree of degradation of the battery by dividing amount of change in charge storage ratio of the battery over a predetermined time by an integrated value of the charge/discharge electric power of the battery over the predetermined time.

In addition, in this hybrid motor vehicle, the controller may control the engine so that the engine is started during stop of operation of the engine when the required power increases to or above the first threshold value or when the charge storage ratio of the battery decreases to or below an engine start charge storage ratio threshold value, and so that operation of the engine is stopped during operation of the engine when the charge storage ratio of the battery increases to or above an engine stop charge storage ratio threshold value that is greater than the engine start charge storage ratio threshold value and the required power decreases to or below the second threshold value.

Furthermore, the foregoing hybrid motor vehicle may further include: an electricity generator configured to give electric power to and receive electric power from the battery; and a planetary gear including three rotating elements connected to a drive shaft linked to an axle, an output shaft of the engine and a rotating shaft of the electricity generator, respectively, and the rotating shaft of the electric motor may be connected to the drive shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
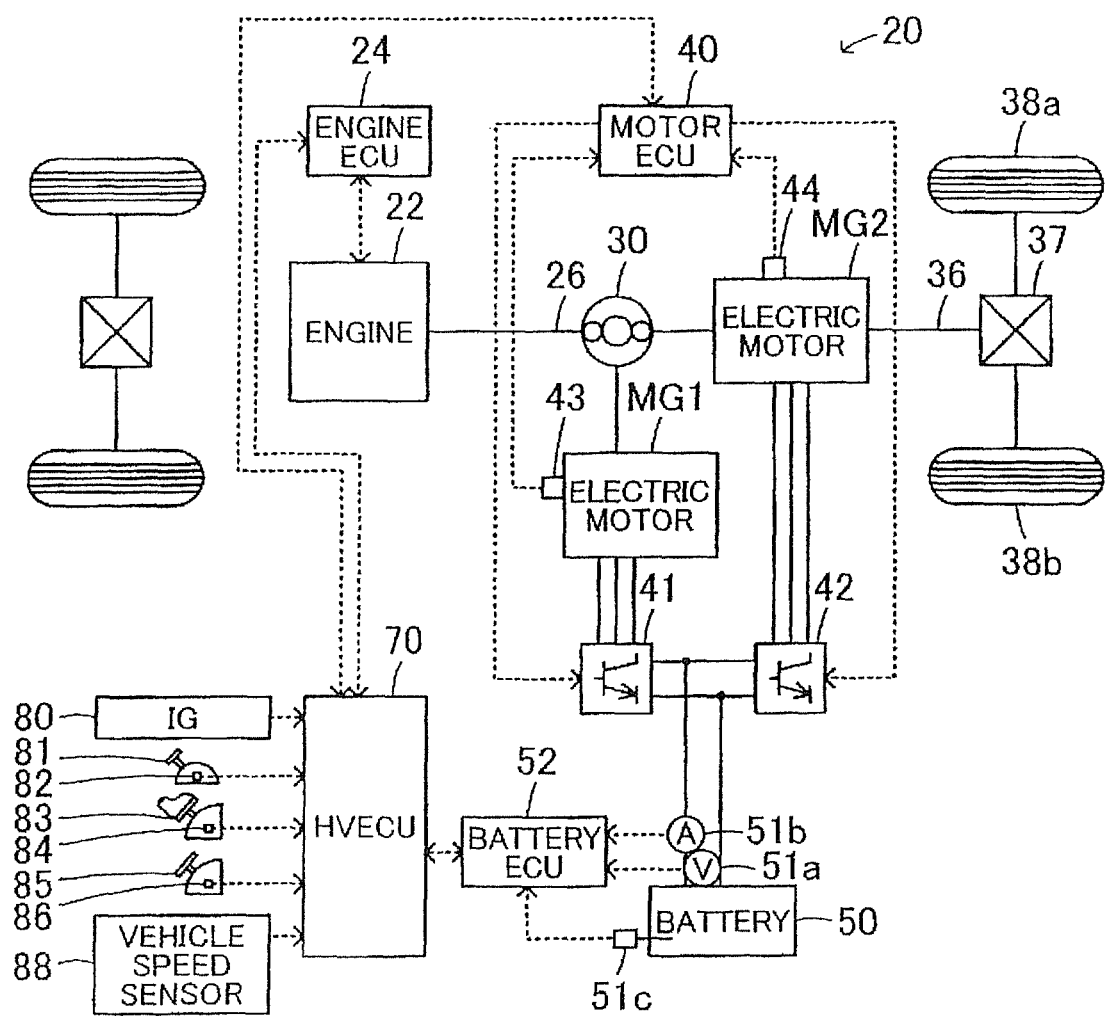
FIG. 1 is a construction diagram showing a hybrid motor vehicle as an embodiment of the invention.

FIG. 1 is a construction diagram showing a general construction of a hybrid motor vehicle 20 as an embodiment of the invention. The hybrid motor vehicle 20 of the embodiment, as shown in FIG. 1, is equipped with an engine 22, an engine electronic control unit (hereinafter, referred to as engine ECU) 24, a planetary gear 30, an electric motor MG1, an electric motor MG2, inverters 41 and 42, an electric motor electronic control unit (hereinafter, referred to as electric motor ECU) 40, a battery 50, a battery electronic control unit (hereinafter, referred to as battery. ECU) 52, and a hybrid-purpose electronic control unit (hereinafter, referred to as HVECU) 70. The engine 22 outputs motive power by using gasoline, light oil, etc. as fuel. The engine ECU 24 drives and controls the engine 22. A carrier of the planetary gear 30 is connected to a crankshaft 26 of the engine 22. A ring gear of the planetary gear 30 is connected to a drive shaft 36 that is linked to driving wheels 38a and 38b via differential gear 37. The electric motor MG1 is configured as a synchronous generator-motor, and a rotor of the electric motor MG1 is connected to a sun gear of the planetary gear 30. The electric motor MG2 is configured as a synchronous generator-motor, and a rotor of the electric motor MG2 is connected to the drive shaft 36. The inverters 41 and 42 drive the electric motors MG1 and MG2. The electric motor ECU 40 drives and controls the electric motors MG1 and MG2 through the switching control of the switching elements (not shown) of the inverters 41 and 42. The battery 50 is configured as a lithium ion secondary battery, and gives electric power to and receives electric power from the electric motors MG1 and MG2 via the inverters 41 and 42. The battery ECU 52 manages the battery 50. The HVECU 70 controls the whole vehicle.

The engine ECU 24 is configured as a microprocessor that has a CPU as a central component although not shown in the drawings. Besides the CPU, the engine ECU 24 includes a ROM that stores processing programs, a RAM for temporarily storing data, input/output ports, and a communication port. The engine ECU 24 accepts inputs of various signals from various sensors that detect operation states of the engine 2, via input ports. The various signals input to the engine ECU 24 are, for example, a crank position θcr from a crank position sensor that detects the rotational position of the crankshaft 26, a coolant temperature Tw from a coolant temperature sensor that detects the temperature of coolant of the engine 22, an in-cylinder pressure Pin from a pressure sensor attached within a combustion chamber, a cam position θca from a cam position sensor that detects the rotational position of a camshaft that opens and closes intake values and exhaust valves for intake to and exhaust from the combustion chambers, a throttle position TP from a throttle valve position sensor that detects the position of a throttle valve, an intake air flow rate Qa from an air flow meter attached to an intake pipe, an intake air temperature Ta from a temperature sensor attached to the intake pipe, an air/fuel ratio AF from an air/fuel ratio sensor attached to an exhaust system, an oxygen signal O2 from an oxygen sensor attached to the exhaust system, etc. The engine ECU 24 outputs various control signals for driving the engine 22, via output ports. The control signals that the engine ECU 24 outputs are, for example, a drive signal to fuel injection valves, a drive signal to a throttle electric motor that adjusts the position of a throttle valve, a control signal to an ignition coil integrated with an igniter, a control signal to a variable valve timing mechanism capable of varying the open/close timing of the intake valves. Furthermore, the engine ECU 24 communicates with the HVECU 70, and controls operation of the engine 22 by a control signal from the HVECU 70, and outputs data regarding the operation state of the engine 22 to the HVECU 70 according to need. Incidentally, the engine ECU 24 computes the rotation speed of the crankshaft 26, that is, the rotation speed Ne of the engine 22, on the basis of the signal from the crank position sensor (not shown) attached to the crankshaft 26.

The electric motor ECU 40 is configured as a microprocessor that includes a CPU as a central component although not shown in the drawings. Besides the CPU, the electric motor ECU 40 further includes a ROM that stores processing programs, a RAM for temporarily storing data, input/output ports and a communication port. The electric motor ECU 40 accepts inputs of signals necessary to drive and control the electric motors MG1 and MG2, via input ports. The signals input to the electric motor ECU 40 are, for example, rotational positions θm1 and θm2 from rotational position detection sensors 43 and 44 that each detect the rotational position of a rotor of a corresponding one of the electric motors MG1 and MG2, phase currents applied to the electric motors MG1 and MG2 which are detected by electric current sensors (not shown), etc. The electric motor ECU 40 outputs a switching control signal to switching elements (not shown) of the inverters 41 and 42, etc., via output ports. The electric motor ECU 40 communicates with the HVECU 70, and drives and controls the electric motors MG1 and MG2 by control signals from the HVECU 70. The electric motor ECU 40 outputs to the HVECU 70 data regarding the states of operation of the electric motors MG1 and MG2 according to need. The electric motor ECU 40 computes rotational angular speeds ωm1 and ωm2 and rotation speeds Nm1 and Nm2 of the electric motors MG1 and MG2 on the basis of the rotational positions θm1 and θm2 of the rotors of the electric motors MG1 and MG2 detected by the rotational position detection sensors 43 and 44.

The battery ECU 52 is configured as a microprocessor that has a CPU as a central component although not shown in the drawings. Besides the CPU, the battery ECU 52 further includes a ROM that stores processing programs, a RAM for temporarily storing data, input/output ports and a communication port. The battery ECU 52 accepts inputs of signals necessary to manage the battery 50. The signals input to the battery ECU 52 are, for example, an inter-terminal voltage Vb from a voltage sensor 51a disposed between the terminals of the battery 50, a charge/discharge current Ib from an electric current sensor 51b attached to an electric power line connected to an output terminal of the battery 50, a battery temperature Tb from a temperature sensor 51c attached to the battery 50, etc. The battery ECU 52 sends to the HVECU 70 data regarding the state of the battery 50 according to need, via communication. Furthermore, in order to manage the battery 50, the battery ECU 52 computes a charge storage ratio (state of charge) SOC that is the ratio of the amount of electric power dischargeable from the battery 50 to the total capacity of the battery 50 on the basis of the integrated value of the charge/discharge current Ib detected by the electric current sensor 51b, or computes input/output limits Win and Wout that are permissible input/output electric powers that are allowed to be charged into and discharged from the battery 50, on the basis of the charge storage ratio SOC computed and the battery temperature Tb. Incidentally, the input/output limits Win and Wout of the battery 50 are set by setting basic values of the input/output limits Win and Wont on the basis of the battery temperature Tb, and setting an output limiting correction factor and an input limiting correction factor on the basis of the charge storage ratio SOC of the battery 50, and multiplying the set basic values of the input/output limits Win and Wont by the correction factors.

The HVECU 70 is configured as a microprocessor that has a CPU as a central component although not shown in the drawings. Besides the CPU, the HVECU 70 further includes a ROM that stores processing programs, a RAM for temporarily storing data, input/output ports and a communication port. The HVECU 70 accepts inputs of an ignition signal from an ignition switch 80, a shift position SP from a shift position sensor 82 that detects the operating position of a shift lever 81, an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, a vehicle speed V from a vehicle speed sensor 88, etc., via input ports. The HVECU 70, as described above, is connected to the engine ECU 24, the electric motor ECU 40 and the battery ECU 52 via communication ports, and exchanges various control signals and data with the engine ECU 24, the electric motor ECU 40 and the battery ECU 52.

In the hybrid motor vehicle 20 of the embodiment configured as described above, a required torque Tr* that needs to be output to the drive shaft 36 is calculated on the basis of the vehicle speed V and the accelerator operation amount Acc that corresponds to the amount of the driver's depression of the accelerator pedal, and the operation of the engine 22, the electric motor MG1 and the electric motor MG2 are operated and controlled so that the required motive power that corresponds to the required torque Tr* is output to the drive shaft 36. As for the operation control of the engine 22, the electric motor MG1 and the electric motor MG2, there are a torque conversion operation mode, a charge/discharge operation mode, an electric motor operation mode, etc. During the torque conversion operation mode, the engine 22 is operated and controlled so that the engine 22 outputs the required motive power, and the electric motor MG1 and the electric motor MG2 are driven and controlled so that all the motive power output by the engine 22 is converted in torque by the planetary gear 30, the electric motor MG1 and the electric motor MG2, and then is output to the drive shaft 36. During the charge/discharge operation mode, the engine 22 is operated and controlled so that the engine 22 outputs a motive power that corresponds to the sum of the required motive power and the electric power necessary to charge or discharge the battery 50, and the electric motor MG1 and the electric motor MG2 are driven and controlled so that a part or all of the motive power output by the engine 22, with the battery 50 being charged or discharged, is converted in torque by the planetary gear 30, the electric motor MG1 and the electric motor MG2 and the required motive power is output to the drive shaft 36. During the electric motor operation mode, the operation of the engine 22 is stopped, and the electric motor MG2 is operated and controlled so that the required motive power is output to the drive shaft 36. Incidentally, the torque conversion operation mode and the charge/discharge operation mode are both a mode in which the engine 22, the electric motor MG1 and the electric motor MG2 are controlled so that the required motive power is output to the drive shaft 36, with the engine 22 operated, and are not substantially different from each other in terms of control. Hereinafter, these two operation modes will be collectively referred to as engine operation mode.

Figure 2A:
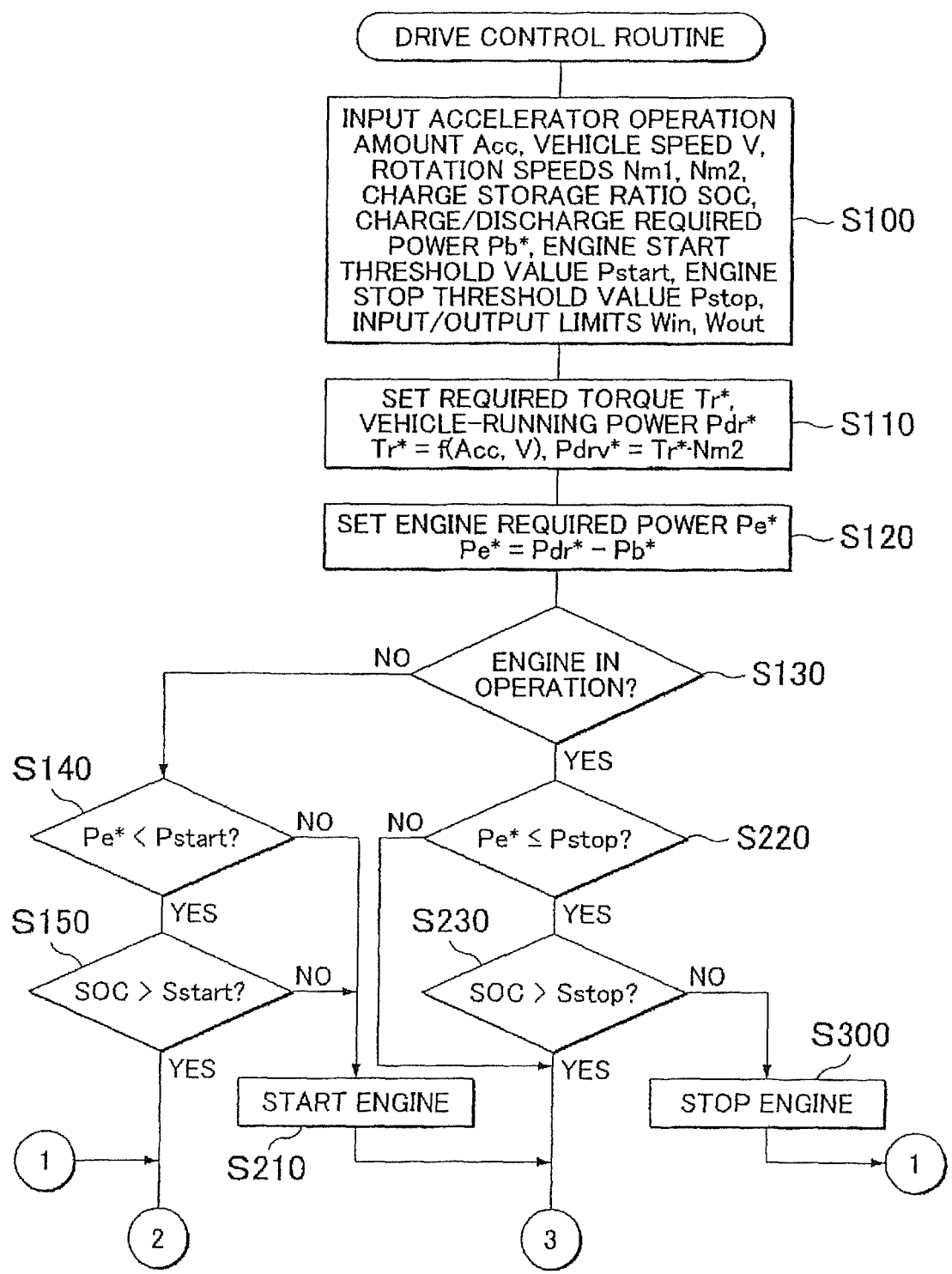
FIGS. 2A and 2B is a flowchart showing an example of a drive control routine executed by an HVECU of the embodiment.
Figure 2B:
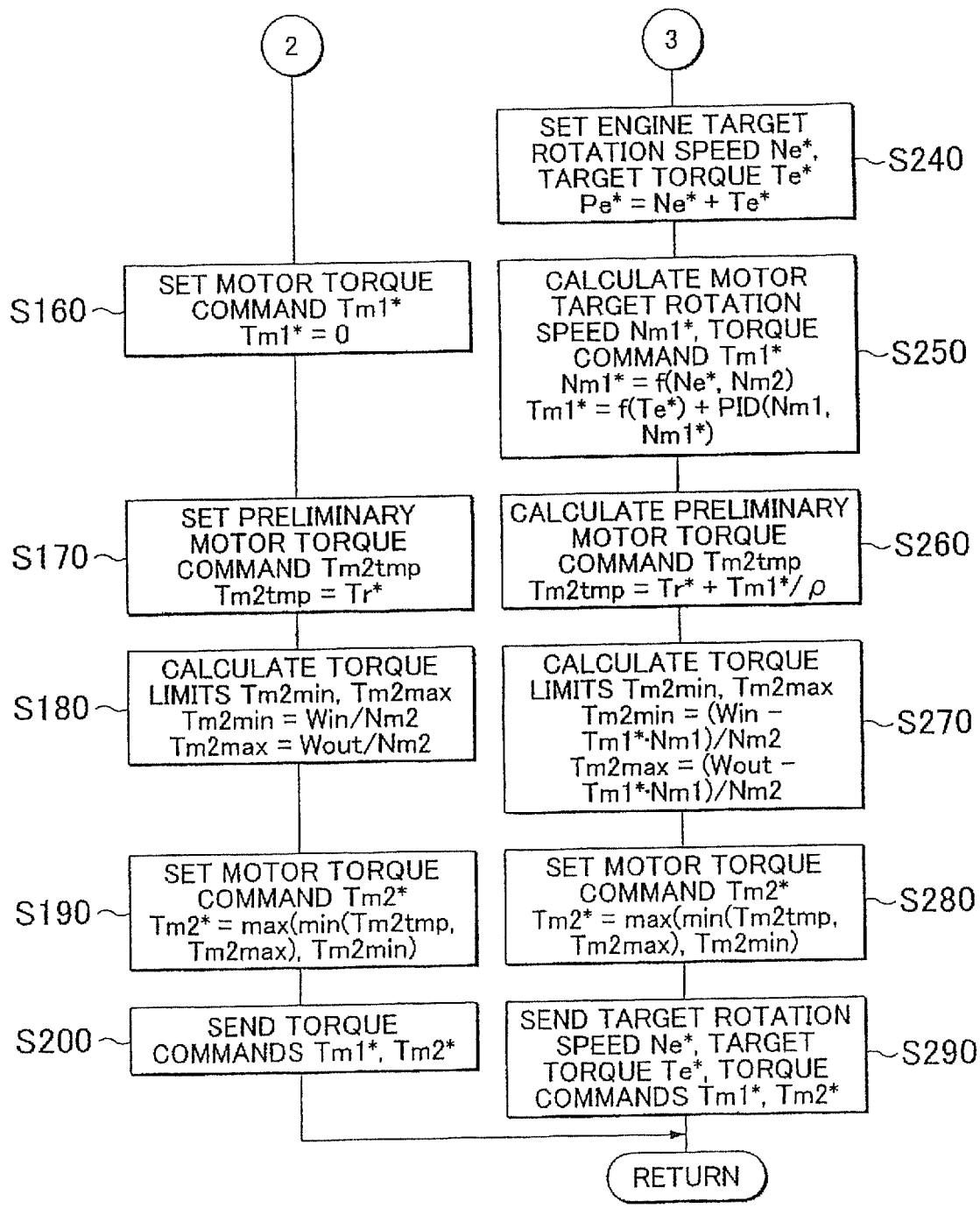

Next, operations of the hybrid motor vehicle 20 of the embodiment constructed as described above will be described. FIGS. 2A and 2B is a flowchart showing an example of a drive control routine executed by the HVECU 70 of the embodiment. This routine is repeatedly executed at every predetermined time (e.g., every several milliseconds).

When the drive control routine is executed, the HVECU 70 firstly takes in data necessary for controls, including: the accelerator operation amount Acc from the accelerator pedal position sensor 84; the vehicle speed V from the vehicle speed sensor 88; the rotation speeds Nm1 and Nm2 of the electric motors Mg1 and MG2; the charge storage ratio SOC, the input/output limits Win and Wout and the charge/discharge required power Pb* of the battery 50; an engine start threshold value Pstart for use for determining whether to start the engine 22 during stop of operation of the engine 22; an engine stop threshold value Pstop for use for determining whether to stop the engine 22 during operation of the engine 22, etc. (step S10). It is to be noted herein that, as for the rotation speeds Nm1 and Nm2 of the electric motors MG1 and MG2, the rotation speeds computed on the basis of the rotational positions θm1 and θm2 of the rotors of the electric motors MG1 and MG2 detected by the rotational position detection sensors 43 and 44, respectively, are input to the HVECU 70 from the electric motor ECU 40 through communication. Furthermore, as for the charge storage ratio SOC of the battery 50, the ratio value computed on the basis of the integrated value of the charge/discharge current Ib detected by the electric current sensor 51$b$ is input to the HVECU 70 from the battery ECU 52 through communication. As for the input/output limits Win and Wont of the battery 50, the limit values set on the basis of the battery temperature Tb of the battery 50 detected by the temperature sensor 51$c$ and the charge storage ratio SOC of the battery 50 are input to the HVECU 70 from the battery ECU 52 through communication. As for the charge/discharge required power Pb*, the engine start threshold value Pstart and the engine stop threshold value Pstop of the battery 50, the values set by a control-purpose value setting routine described below and written into the RAM (not shown) are read out into the HVECU 70. Incidentally, with regard to the input/output limits Win and Wout and the charge/discharge required power Pg* of the battery 50, the side of the positive sign is defined as being the side of discharge from the battery 50.

Figure 3:
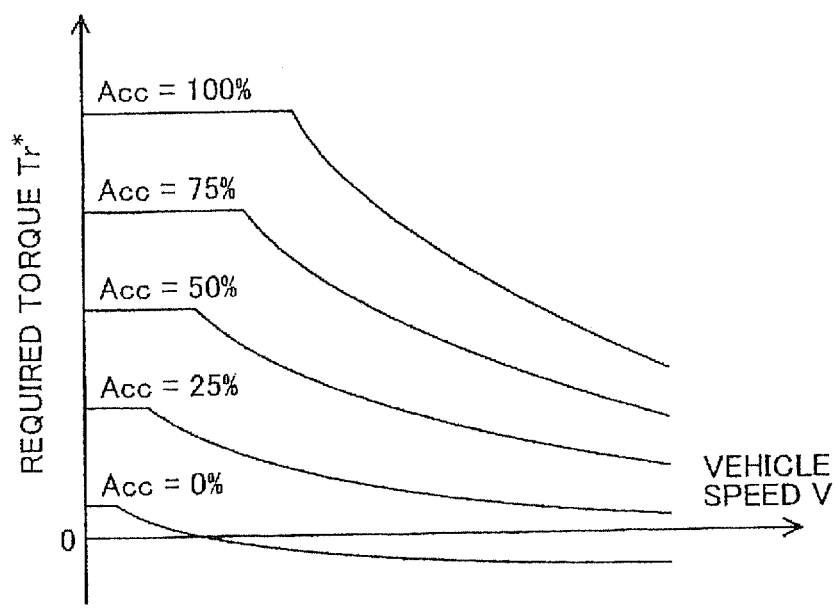
FIG. 3 is an illustrative diagram showing an example of a required torque setting map.

After data are input to the HVECU 70 in this manner, a required torque Tr* that is required for running the vehicle (that needs to be output to the drive shaft 36) is set on the basis of the input accelerator operation amount Acc and the input vehicle speed V. A vehicle running power Pdrv* required for running the vehicle is calculated by multiplying the set required torque Tr* by the rotation speed Nr of the drive shaft 36 (e.g., the rotation speed Nm2 of the electric motor MG2, the rotation speed obtained by multiplying the vehicle speed V by a conversion factor, etc.) (step S110). A required power Pe* that is required of the vehicle (that the engine 22 needs to output) is calculated by subtracting the charge/discharge required power Pg* of the battery 50 from the calculated vehicle running power Pdr* (step S120). In this embodiment, a required torque setting map in which a relationship among the accelerator operation amount Acc, the vehicle speed V and the required torque Tr* is determined beforehand is pre-stored in the ROM (not shown), and when an accelerator operation amount Acc and a vehicle speed V are given, a required torque Tr* that corresponds to the given accelerator operation amount Acc and the given vehicle speed V is derived from the stored map. An example of the required torque setting map is shown in FIG. 3.

Subsequently, it is determined whether the engine 22 is in operation or in the stopped state (step S130). When it is determined that the engine 22 is in the stopped state, the required power Pe* is compared with the engine start threshold value Pstart (step S140), and the charge storage ratio SOC of the battery 50 is compared with the engine start threshold value Sstart (step S150). It is to be noted herein that the engine start threshold value Sstart is determined as an upper limit of the range of the charge storage ratio SOC in which the running of the vehicle in an engine operation mode needs to be entered in order to restrain excess discharge of the battery 50. For example, 35%, 37%, 40%, etc., can be used as a value of the charge storage ratio SOC. The process of steps S140 and S150 is a process of determining whether the startup condition of the engine 22 has been satisfied.

When the required power Pe* is less than the engine start threshold value Pstart and the charge storage ratio SOC of the battery 50 is greater than the engine start threshold value Sstart, it is determined that the startup condition of the engine 22 has not been satisfied, and a torque command Tm1* of the electric motor MG1 is set at a value of 0 (step S160). Subsequently, the required torque Tr* is set at a preliminary torque Tm2$tmp$ that is a preliminary value of the torque that needs to be output from the electric motor MG2 (step S170). Then, torque limits Tm2min and Tm2max as lower and upper limits of the torque that is allowed to be output from the electric motor MG2 are calculated by dividing the input/output limits Win and Wout of the battery 50 by the rotation speed Nm2 of the electric motor MG2 (step S180). After that, a torque command Tm2* as a torque that needs to be output from the electric motor MG2 is set by restricting the preliminary torque Tm2$tmp$ with the torque limits Tm2min and Tm2max, as shown by the expression (1) below (step S190).

$$Tm2^* = \max(\min(Tm2tmp, Tm2\max), Tm2\min) \qquad (1)$$

After the torque commands Tm1* and Tm2* of the electric motors MG1 and MG2 are set in the above-described manner, the set torque commands Tm1* and Tm2* of the electric motors MG1 and MG2 are sent to the electric motor ECU 40 (step S200). After that, this routine ends. The electric motor ECU 40, after receiving the torque commands Tm1* and Tm2* of the electric motors MG1 and MG2, performs a switching control of the switching elements (not shown) of the inverters 41 and 42 so that the electric motors MG1 and MG2 are driven with the torque commands Tm1* and Tm2*. Due to the foregoing control, the vehicle can be run by outputting the required torque Tr* (vehicle running power Pdrv*) to the drive shaft 36 within the range of the input/output limits Win and Wont of the battery 50, in the electric motor operation mode.

Figure 4:
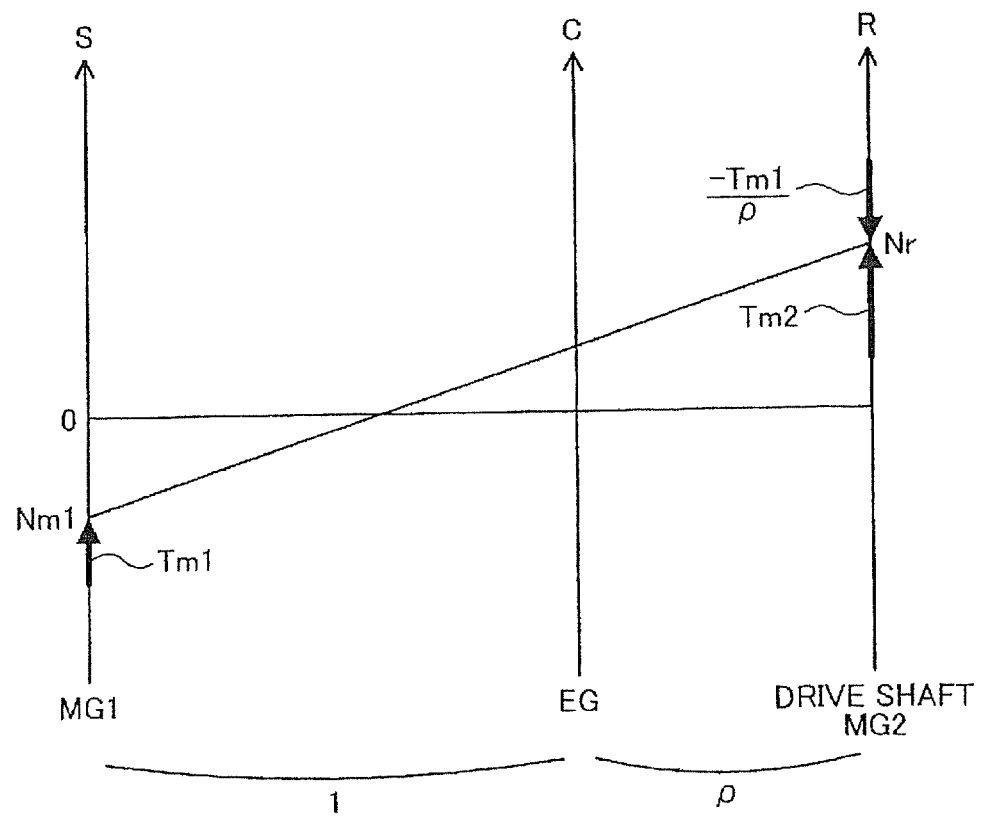
FIG. 4 is an illustrative diagram showing an example of an alignment chart that shows a dynamic relation in rotation speed and torque among rotating elements of a planetary gear at the time of starting the engine.

If in step S140, the required power Pe* is greater than or equal to the engine start threshold value Pstart, or if in step S150, the charge storage ratio SOC of the battery 50 is less than or equal to the engine start threshold value Sstart, it is then determined that the startup condition of the engine 22 has been satisfied, and the engine 22 is started (step S210). FIG. 4 is an illustrative diagram showing an example of an alignment chart that shows a dynamic relation in rotation speed and torque among rotating elements of the planetary gear 30 at the time of starting the engine 22. In FIG. 4, an S axis on the left shows the rotation speed of the sun gear 31 that is the same as the rotation speed Nm1 of the electric motor MG1, a C axis shows the rotation speed of the carrier 34 that is the same as the rotation speed Ne of the engine 22, and an R axis shows the rotation speed Nr of the ring gear 32 that is the same as the rotation speed Nm2 of the electric motor MG2. Furthermore, two wide-line arrows on the R axis show a torque that is output from the electric motor MG1 and acts on the drive shaft 36 and a torque that is output from the electric motor MG2 and acts on the drive shaft 36. The engine 22 is started as follows. That is, the engine 22 is cranked by outputting from the electric motor MG1 the torque for cranking the engine 22 and outputting from the electric motor MG2 a cancel torque for cancelling the torque that acts on the drive shaft 36 in association with the output of the cranking torque. Then, the fuel injection control, the ignition control, etc. are started when the rotation speed Ne of the engine 22 reaches a predetermined rotation speed (e.g., 1000 rpm). Incidentally, during the starting of the engine 22, too, the drive control of the electric motor MG2 is performed so that the required torque Tr* is output to the drive shaft 36 in the range of the input/output limits Win and Wont of the battery 50. That is, the torque (preliminary torque Tm2tmp) that needs to be output from the electric motor MG2 is the sum of the required torque Tr* and the cancel torque.

Figure 5:
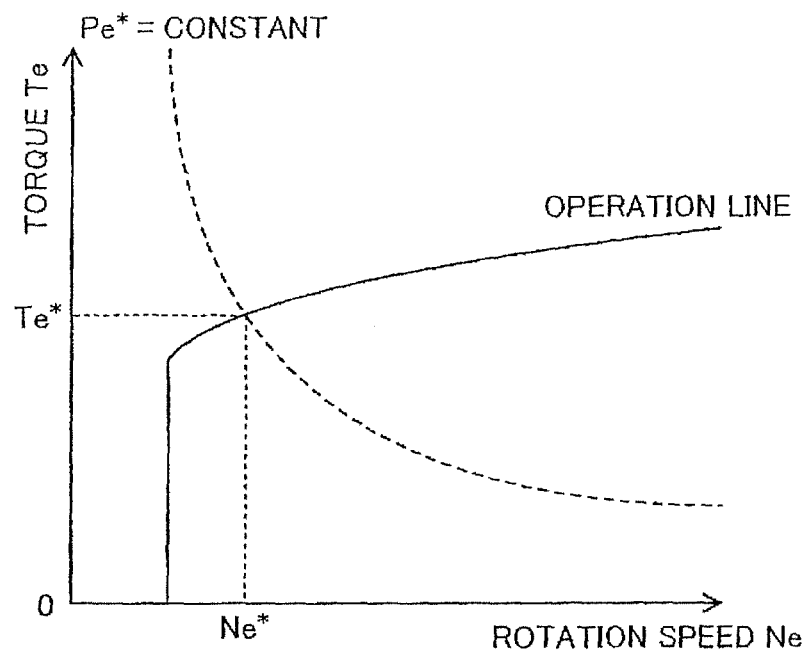
FIG. 5 is an illustrative diagram showing an example of an operation line of the engine and how a target rotation speed and a target torque are set.

After the engine 22 is started, a target rotation speed Ne* and a target torque Te* as an operation point at which the engine 22 is to be operated are set on the basis of the required power Pe* and an operation line for efficient operation of the engine 22 (e.g., a fuel economy operation line) (step S240). FIG. 5 shows an example of an operation line of the engine 22 and how the target rotation speed Ne* and the target torque Te* are set. The target rotation speed Ne* and the target torque Te*, as shown in FIG. 5, can be found as an intersection point between the operation line and a curved line of a constant required power Pe*(Ne*×Te*).

Figure 6:
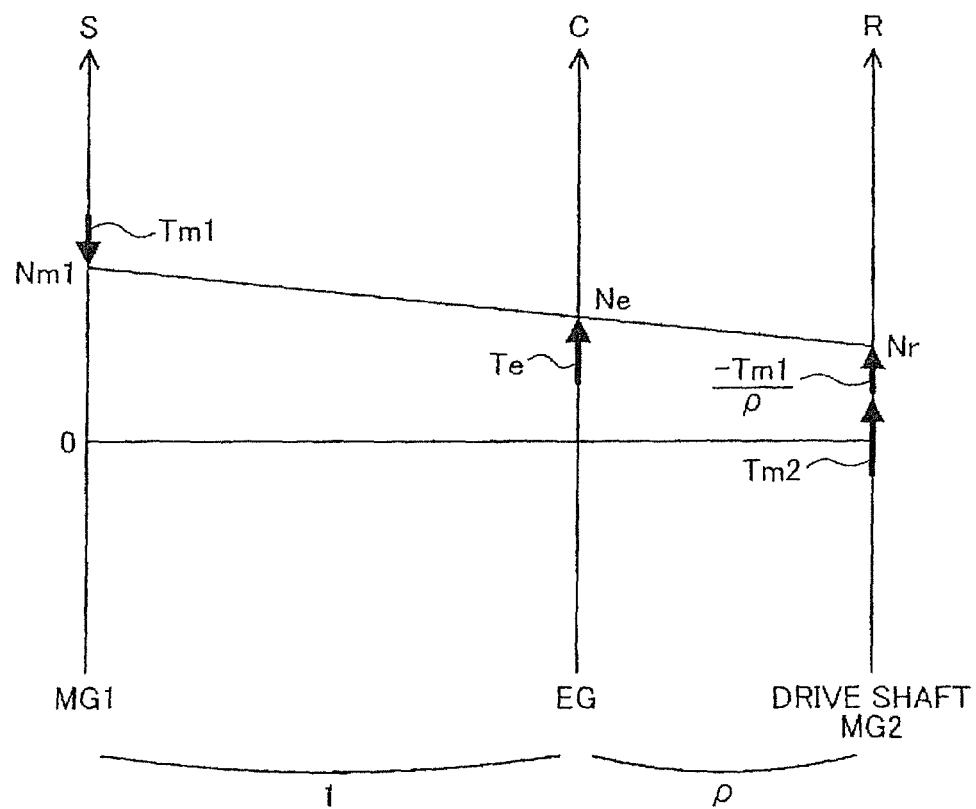
FIG. 6 is an illustrative diagram showing an example of an alignment chart that shows a dynamic relation in rotation speed and torque among the rotating elements of the planetary gear when the vehicle is running while the engine is outputting power.

Subsequently, using the target rotation speed Ne* of the engine 22, the rotation speed Nm2 of the electric motor MG2 and the gear ratio ρ of the planetary gear 30, the target rotation speed Nm1* of the electric motor MG1 is calculated as in the expression (2) below. A torque command Tm1* of the electric motor MG1 is calculated from the calculated target rotation speed Nm1* and the present rotation speed Nm1 of the electric motor MG1 as in the expression (3) below (step S250). The expression (2) is a dynamical relational expression for the rotating elements of the planetary gear 30. FIG. 6 shows an example of an alignment chart showing a dynamical relation in rotation speed and torque among the rotating elements of the planetary gear 30 when the vehicle is running while the engine 22 is outputting power. The expression (2) can easily be derived by using the alignment chart. The expression (3) is a relational expression in the feedback control for causing the electric motor MG1 to turn at the target rotation speed Nm1*. In expression (3). "k1" in the second term on the right side is a gain of a proportional term, and "k2" in the third term on the right side is a gain of an integral term.

$$Nm1^* = Ne^* \cdot (1+\rho)/\rho - Nm2/\rho \tag{2}$$

$$Tm1^* = \rho \cdot Te^*/(1+\rho) + k1(Nm1^* - Nm1) + k2\int(Nm1^* - Nm1)dt \tag{3}$$

Next, as shown in the expression (4), a preliminary torque Tm2tmp of the electric motor MG2 is set by adding the required torque Tr* to a value obtained by dividing the torque command Tm1* of the electric motor MG1 by the gear ratio ρ of the planetary gear 30 ((the number of teeth of the sun gear)/(number of teeth of the ring gear)) (step S260). As shown in expressions (5) and (6), torque limits Tm2min and Tm2max of the electric motor MG2 are calculated by dividing values obtained by subtracting a consumed electric power (generated electric power) of the electric motor MG1 obtained by multiplying the torque command Tm1* of the electric motor MG1 by the present rotation speed Nm1 of the electric motor MG1 from the input/output limits Win and Wout of the battery 50, respectively, by the rotation speed Nm2 of the electric motor MG2 (step S270). As shown in the expression (1) mentioned above, the torque command Tm2* of the electric motor MG2 is set by restricting the preliminary torque Tm2tmp with the torque limits Tm2min and Tm2max (step S280). It is to be noted herein that the expression (4) can easily be derived from the alignment chart shown in FIG. 6.

$$Tm2tmp = Tr^* + Tm1^*/\rho \tag{4}$$

$$Tm2\min = (Win - Tm1^* \cdot Nm1)/Nm2 \tag{5}$$

$$Tm2\max = (Wout - Tm1^* \cdot Nm1)/Nm2 \tag{6}$$

Then, the target rotation speed Ne* and the target torque Te* of the engine 22 are sent to the engine ECU 24, and the torque commands Tm1* and Tm2* of the electric motors MG1 and MG2 are sent to the electric motor ECU 40 (step S290). After that, this routine ends. The engine ECU 24, after receiving the target rotation speed Ne* and the target torque Te* of the engine 22, performs various controls of the engine 22, such as an intake air flow rate control, a fuel injection control, the ignition control, etc., so that the engine 22 is operated at an operation point that is indicated by the target rotation speed Ne* and the target torque Te*. The electric motor ECU 40, after receiving the torque commands Tm1* and Tm2* of the electric motors MG1 and MG2, performs the switching control of the switching elements (not shown) of the inverters 41 and 42 so that the electric motors MG1 and MG2 are driven with the torque commands Tm1* and Tm2*. Due to this control, the vehicle can be run by outputting the required torque Tr* (vehicle running power Pdrv*) to the drive shaft 36 within the range of the input/output limits Win and Wont of the battery 50, in the engine operation mode.

After the running of the vehicle in the engine operation mode is started, the engine 22 is determined as being in operation in step S130 the next time this routine is executed. The required power Pe* is compared with the engine stop threshold value Pstop, which is smaller than the engine start threshold value Pstart (step S220), and the charge storage ratio SOC of the battery 50 is compared with the engine stop threshold value Sstop, which is larger than the engine start threshold value Sstart (step S230). It is to be noted herein that, for example, 45%, 47%, 50%, etc. can be used as the engine stop threshold value Sstop. The process of the steps S220 and S230 is a process of determining whether the stop condition of the engine 22 has been satisfied.

When the required power Pe* is greater than the engine stop threshold value Pstop or when the charge storage ratio SOC of the battery 50 is less than the threshold value Sstop, it is determined that the stop condition of the engine 22 has not been satisfied, and then the target rotation speed Ne* and the target torque Te* of the engine 22 and the torque commands Tm1* and Tm2* of the electric motors MG1 and MG2 are set so that the required torque Tr* is output to the drive shaft 36 within the range of the input/output limits Win and Wout of the battery 50 in the engine operation mode, and then the target rotation speed Ne* and the target torque Te* of the engine 22 and the torque commands Tm1* and Tm2* of the electric motors MG1 and MG2 are sent to the engine ECU 24 or the electric motor ECU 40 (steps S240 to S290). After that, this routine ends.

On the other hand, when the required power Pe* is less than or equal to the engine stop threshold value Pstop and the charge storage ratio SOC of the battery 50 is greater than or equal to the engine stop threshold value Sstop, it is determined that the stop condition of the engine 22 has been satisfied, and then the operation of the engine 22 is stopped (step S300), and the torque commands Tm1* and Tm2* of the electric motors MG1 and MG2 are set so that the required torque Tr* is output to the drive shaft 36 within the input/output limits Win and Wout of the battery 50 in the electric motor operation mode, and then the torque commands Tm1* and Tm2* are sent to the electric motor ECU 40 (steps S160 to S200). After that, the routine ends.

Figure 7:
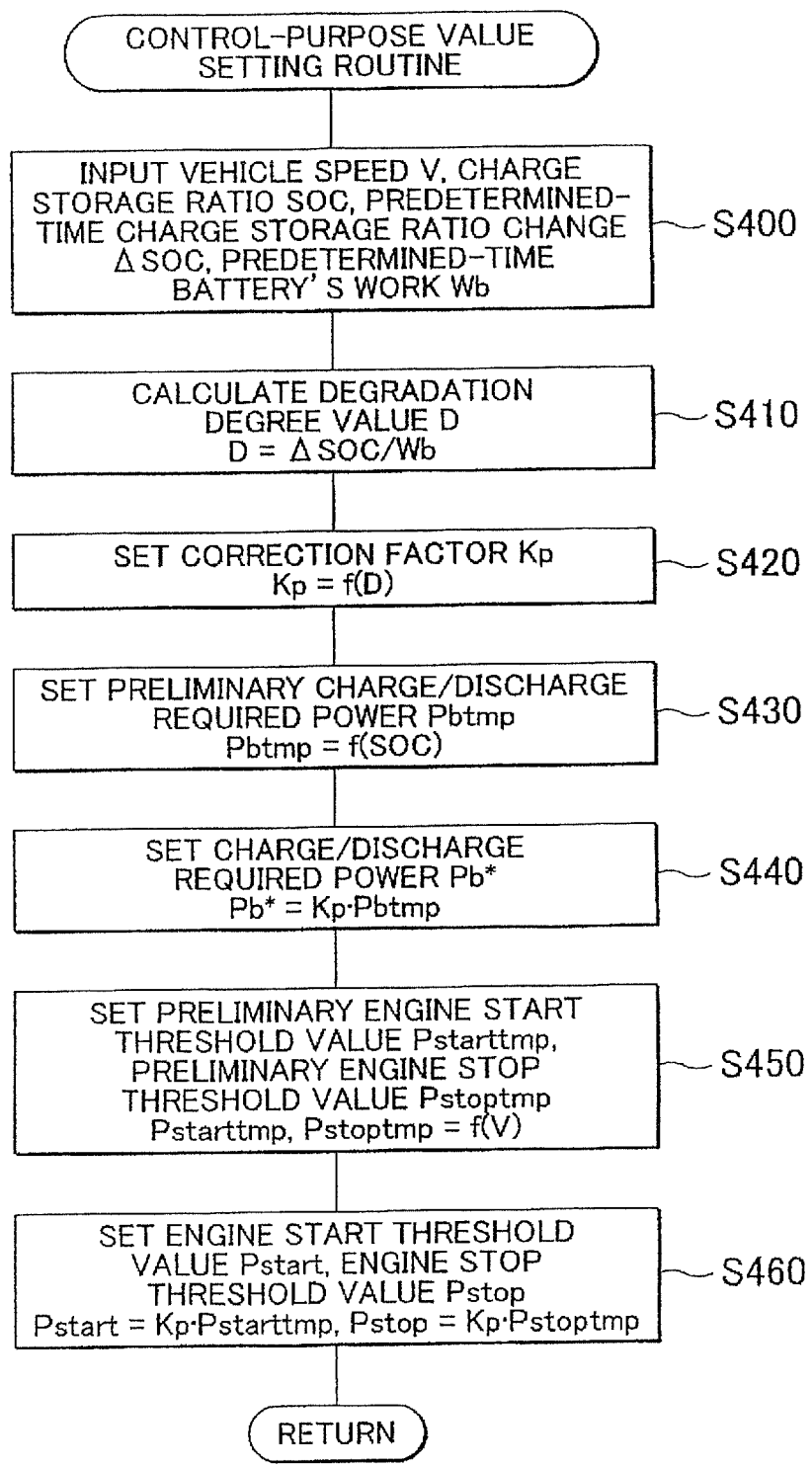
FIG. 7 is a flowchart showing an example of a control-purpose value setting routine that is executed by the HVECU of the embodiment.

The drive control routine shown in FIGS. 2A and 2B has been described above. Next, a process of setting the charge/discharge required power Pb*, the engine start threshold value Pstart and the engine stop threshold value Pstop of the battery 50 in a control-purpose value setting routine illustrated in FIG. 7 will be described. This routine is repeatedly executed by the HVECU 70 at every predetermined time (e.g., every several milliseconds).

When the control-purpose value setting routine is executed, the HVECU 70 firstly executes a process of taking in data such as the vehicle speed V, the charge storage ratio SOC of the battery 50, a predetermined-time charge storage ratio change ΔSOC that is the amount of change in the charge storage ratio SOC of the battery 50 over a predetermined time (e.g., 0.5 second, 1 second, 1.5 seconds, etc.), a predetermined-time battery's work Wb that is the amount of work of the battery 50 for a predetermined time, etc. (step S400). The methods of inputting the vehicle speed V and the charge storage ratio SOC have been described above. The predetermined-time charge storage ratio change ΔSOC is a value computed by subtracting from the last (latest) calculated charge storage ratio SOC the charge storage ratio SOC computed the predetermined time before, and is input from the battery ECU 52 through communication. The predetermined-time battery's work Wb is a value computed as an integrated value of the charge/discharge electric power (Vb×Ib) of the battery 50 as a multiplication product of the inter-terminal voltage Vb of the battery 50 from the voltage sensor 51a and the charge/discharge current Ib of the battery 50 from the electric current sensor 51b, from a predetermined time ago to the present (latest).

After data are input in this manner, the input predetermined-time charge storage ratio change ΔSOC is divided by the predetermined-time battery's work Wb to calculate the degradation degree value D as a value that indicates the degree of degradation of the battery 50 (step S410). Generally, the battery 50 has a tendency that as degradation of the battery 50 progresses, the change of the charge storage ratio SOC to the same amount of work enlarges. Therefore, the degradation degree value D enlarges with progress of the degradation of the battery 50.

Figure 8:
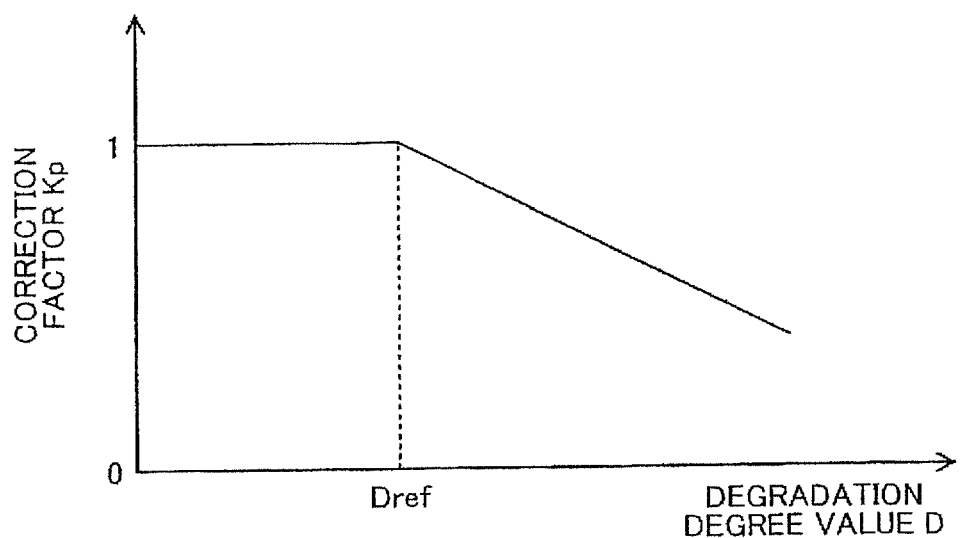
FIG. 8 is an illustrative diagram showing an example of a correction factor setting map.

A correction factor Kp for use in a process of setting the charge/discharge required power Pb* of the battery 50, a setting process for the engine start threshold value Pstart and a setting process for the engine stop threshold value Pstop is set on the basis of the calculated degradation degree value D (step S420). It is to be noted herein that in this embodiment, the correction factor Kp is set as follows. That is, a correction factor setting map in which a relation between the degradation degree value D and the correction factor Kp is determined beforehand is pre-stored in the ROM (not shown), and when a degradation degree value D is given, a correction factor Kp that corresponds to the given degradation degree value D is derived from the stored map. An example of the correction factor setting map is shown in FIG. 8. In FIG. 8, "Dref" is a permissible upper limit value of the degradation degree value D (the degree of degradation of the battery 50) (an upper limit value of a range of the degradation degree value D in which the battery 50 can be regarded as not having degraded), and may be a value that has been determined beforehand through an experiment, analysis, etc. As shown in FIG. 8, when the degradation degree value D is less than or equal to the permissible upper limit value Dref, the correction factor Kp is set at a value of 1, and when the degradation degree value D is greater than the permissible upper limit value Dref, the correction factor Kp is set with a tendency of decreasing from the value of 1 with increase in the degradation degree value D.

Figure 9:
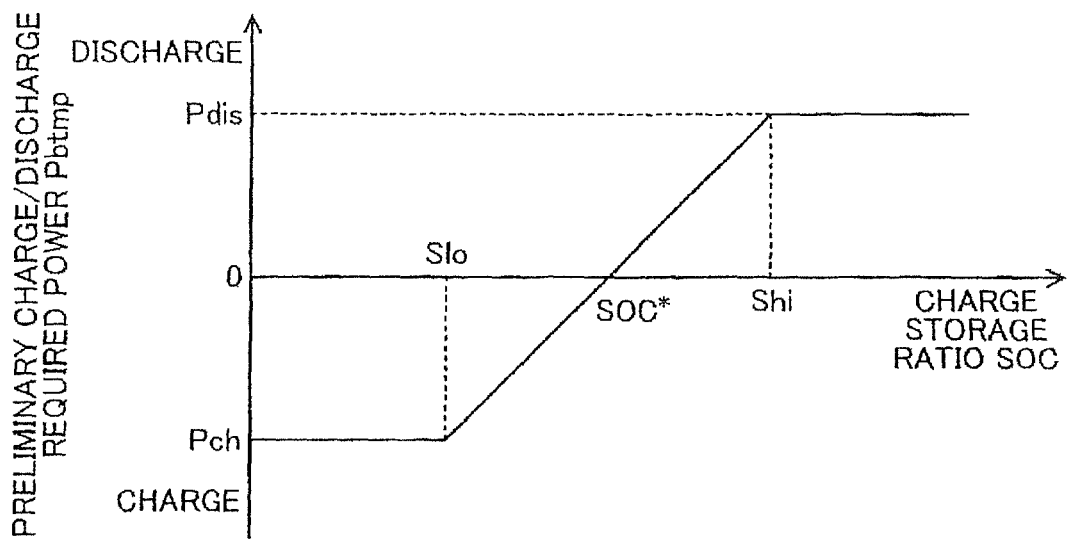
FIG. 9 is an illustrative diagram showing an example of a preliminary charge/discharge required power setting map.

Subsequently, a preliminary charge/discharge required power Pbtmp as a preliminary value of the charge/discharge required power Pb* is set on the basis of the charge storage ratio SOC of the battery 50 (step S430). It is to be noted herein that in this embodiment, a preliminary charge/discharge required power setting map in which a relation between the charge storage ratio SOC of the battery 50 and the preliminary charge/discharge required power Pbtmp is determined beforehand is pre-stored in the ROM (not shown), and when a charge storage ratio SOC is given, a corresponding preliminary charge/discharge required power Pbtmp is derived from the stored map. An example of the preliminary charge/discharge required power setting map is shown in FIG. 9. As shown in FIG. 9, when the charge storage ratio SOC is equal to a target ratio SOC* (e.g., 55%, 60%, 65%, etc.), the preliminary charge/discharge required power Pbtmp is set at a value of 0. When the charge storage ratio SOC is greater than the target ratio SOC*, the preliminary charge/discharge required power Pbtmp is set as a value that tends to increase toward a predetermined positive electric power Pdis (e.g., +2 kW, +3 kW, +5 kW, etc.) as the charge storage ratio SOC increases until the charge storage ratio SOC reaches a ratio Shi that is greater than the target ratio SOC*. When the charge storage ratio SOC is greater than the ratio Shi, the preliminary charge/discharge required power Pbtmp is set at a predetermined electric power Pdis. On the other hand, when the charge storage ratio SOC is smaller than the target ratio SOC*, the preliminary charge/discharge required power Pbtmp is set as a value that tends to decrease toward a predetermined negative electric power Pch (e.g., −2 kW, −3 kW, −5 kW, etc.) as the charge storage ratio SOC decreases until the charge storage ratio SOC reaches a ratio Slo that is smaller than the target ratio SOC*. When the charge storage ratio SOC is smaller than the ratio Slo, the preliminary charge/discharge required power Pbtmp is set at a predetermined electric power Pch.

After the preliminary charge/discharge required power Pbtmp is set in this manner, the set preliminary charge/discharge required power Pbtmp is multiplied by the correction factor Kp to set the charge/discharge required power Pb* of the battery 50 (step S440). When the vehicle runs in the engine operation mode, the charge storage ratio SOC of the battery 50 can be brought closer to the target ratio SOC* by operating the engine 22 at the required power Pe* commensurate with the charge/discharge required power Pb*. Furthermore, due to the setting of the charge/discharge required power Pb* by multiplying the preliminary charge/discharge required power Pbtmp by the correction factor Kp, the absolute value of the charge/discharge electric power of the battery 50 can be made smaller when the degradation degree value D is greater than the permissible upper limit value Dref than when the degradation degree value D is less than or equal to the permissible upper limit value Dref, so that progress of degradation of the battery 50 can be restrained. Furthermore, when the degradation degree value D is greater than the permissible upper limit value Dref, the correction factor Kp is set so as to have a tendency of decreasing with increase in the degradation degree value D. That is, due to the setting of the charge/discharge required power Pb* with a tendency that the absolute value of the charge/discharge required power Pb* becomes smaller as the degradation degree value D is larger, progress of degradation of the battery 50 can be more properly restrained according to the degree of the degradation.

Figure 10:
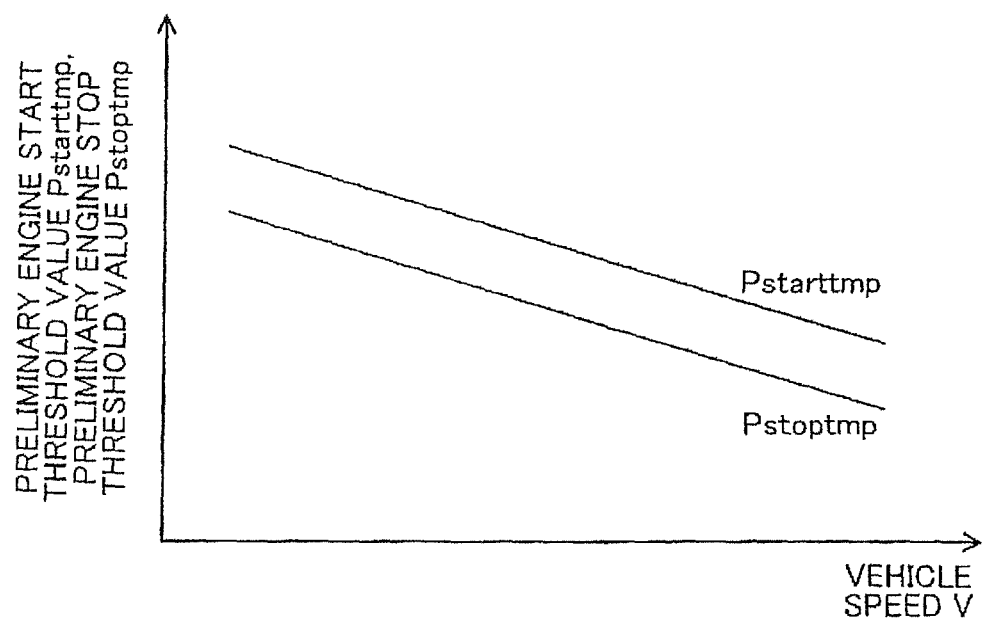
FIG. 10 is an illustrative diagram showing an example of a preliminary engine start/stop threshold value setting map.

Next, a preliminary engine start threshold value Pstarttmp and a preliminary engine stop threshold value Pstoptmp as preliminary values of the engine start threshold value Pstart and the engine stop threshold value Pstop, respectively, are set on the basis of the vehicle speed V (step S450). In the embodiment, a preliminary engine start/stop threshold value setting map in which a relation among the vehicle speed V, the preliminary engine start threshold value Pstarttmp and the preliminary engine stop threshold value Pstoptmp is determined beforehand by an experiment or the like is pre-stored in the ROM (not shown) and, when a vehicle speed V is given, a preliminary engine start threshold value Pstarttmp and a preliminary engine stop threshold value Pstoptmp that correspond to the given vehicle speed V are derived from the stored map, and are set. An example of the preliminary engine start/stop threshold value setting map is shown in FIG. 10. The preliminary engine start threshold value Pstarttmp and the preliminary engine stop threshold value Pstoptmp are set so that, for the same vehicle speeds V, the preliminary engine stop threshold value Pstoptmp is smaller than the preliminary engine start threshold value Pstarttmp, and are set so as to have a tendency of decreasing with increase in the vehicle speed V. The former one of the foregoing two settings is for avoiding an event in which the start and the stop of the engine 22 are frequently repeated. The latter setting is made so that the required torque (vehicle running power Pr*) can be more appropriately coped with (or more often provided), considering that when the vehicle speed V (the rotation speed Nm2 of the electric motor MG2) is great, the output of the electric motor MG2 (rotation speed Nm2×torque Tm2) is also great and the required torque Tr* may possibly become unable to be achieved or appropriately coped with by the output of the electric motor MG2 alone.

Next, the engine start threshold value Pstart and the engine stop threshold value Pstop are set by multiplying the set preliminary engine start threshold value Pstarttmp and the set preliminary engine stop threshold value Pstoptmp by the correction factor Kp as shown in the following expressions (7) and (8), respectively (step S460). After that, the routine ends. The engine start threshold value Pstart and the engine stop threshold value Pstop set as described above are smaller when the degradation degree value D exceeds the permissible upper limit value Dref than when the degradation degree value D is less than or equal to the permissible upper limit value Dref. A reason for setting the engine start threshold value Pstart and the engine stop threshold value Pstop in this manner will be explained below.

$$P\text{start} = Kp \cdot P\text{start}tmp \quad (7)$$

$$P\text{stop} = Kp \cdot P\text{stop}tmp \quad (8)$$

In general, when the vehicle runs in the electric motor operation mode, the required torque Tr* is output to the drive shaft 36 by driving the electric motor MG2 as the battery 50 is discharged. When the vehicle runs in the engine operation mode, the required torque Tr* is output to the drive shaft 36 by driving the electric motors MG1 and MG2 as the battery 50 is charged or discharged according to the operation of the engine 22 and to need. Therefore, the absolute value df the charge/discharge electric power of the battery 50 tends to be larger when the vehicle runs in the electric motor operation mode than when the vehicle runs in the engine operation mode. In this embodiment, the engine start threshold value Pstart and the engine stop threshold value Pstop are smaller when the degradation degree value D exceeds the permissible upper limit value Dref than when the degradation degree value D is less than or equal to the permissible upper limit value Dref. Due to this, during stop of operation of the engine 22, the engine 22 is more likely to be started (i.e., the change from the electric motor operation mode to the engine operation mode is more likely to occur), and during operation of the engine 22, the operation of the engine 22 is less likely to be stopped (i.e., the change from the engine operation mode to the electric motor operation mode is less likely to occur). This restrains the battery 50 from being charged or discharged with large electric power, and restrains progress of degradation of the battery 50. Furthermore, setting the engine start threshold value Pstart and the engine stop threshold value Pstop in the foregoing manner, decrease of the charge storage ratio SOC of the battery 50 can be restrained. As a result, it is possible to restrain the occurrence of an event in which during stop of operation of the engine 22, the charge storage ratio SOC of the battery 50 decreases to or below the engine start threshold value Sstart despite the required power Pe* being less than the engine start threshold value Pstart, and therefore the engine 22 needs to be started. Furthermore, when the degradation degree value D is larger than the permissible upper limit value Dref, the correction factor Kp is set so as to have a tendency of decreasing with increase in the degradation degree value D. That is, because the engine start threshold value Pstart and the engine stop threshold value Pstop are set so as to have this tendency, progress of degradation of the battery 50 can be properly restrained according to the degree of degradation of the battery 50. Moreover, for example, in the case where a driver operates the accelerator so that the vehicle running power Pdr* changes in the vicinity of the preliminary engine start threshold value Pstart or the preliminary engine stop threshold value Pstop, the frequency of starts and stops of the engine 22 reduces. As a result, the power needed in order to start the engine 22 can be reduced and therefore the energy efficiency can be improved.

According to the hybrid motor vehicle 20 of the embodiment described above, the engine start threshold value Pstart and the engine stop threshold value Pstop are set smaller when the degradation degree value D, which indicates the degree of degradation of the battery 50, exceeds the permissible upper limit value Dref than when the degradation degree value D is less than or equal to the permissible upper limit value Dref. This makes it more likely that the vehicle runs in the engine operation mode, and restrains the battery 50 from being charged or discharged with large electric power, and therefore restrains further progress of degradation of the battery 50.

In the hybrid motor vehicle 20 of the embodiment, the engine start threshold value Pstart may be set at a fixed value (preliminary engine start threshold value Pstart) irrespective of the degradation degree value D, and the engine stop threshold value Pstop may be set smaller when the degradation degree value D exceeds the permissible upper limit value Dref than when the degradation degree value D is less than or equal to the permissible upper limit value Dref. In this case, too, during operation of the engine 22, the operation of the engine 22 is less likely to be stopped (the change from the engine operation mode to the electric motor operation mode is less likely to occur). This restrains the battery 50 from being charged or discharged with large electric power, and restrains further progress of degradation of the battery 50.

In the hybrid motor vehicle 20 of the embodiment, it suffices that the correction factor Kp is set smaller when the degradation degree value D exceeds the permissible upper limit value Dref than when the degradation degree value D is less than or equal to the permissible upper limit value Dref.

For example, the correction factor Kp may be set at a fixed value such as a value of 0.5, a value of 0.6, a value of 0.7, etc. That is, in the hybrid motor vehicle 20 of the embodiment, when the degradation degree value D exceeds the permissible upper limit value Dref, the engine start threshold value Pstart and the engine stop threshold value Pstop may be set at values equal to 0.5 time, 0.6 time, 0.7 time, etc. as large as the preliminary engine start threshold value Pstarttmp and the preliminary engine stop threshold value Pstoptmp, respectively.

In the hybrid motor vehicle 20 of the embodiment, the preliminary engine start threshold value Pstarttmp and the preliminary engine stop threshold value Pstoptmp may be set at fixed values irrespective of the vehicle speed V.

In the hybrid motor vehicle 20 of the embodiment, the preliminary charge/discharge required power Pbtmp may be directly set as the charge/discharge required power Pb* without using the correction factor Kp, irrespective of the degradation degree value D.

In the hybrid motor vehicle 20 of the embodiment, the degradation degree value D regarding the battery 50 may be obtained, for example, as the amount of change in a discharge characteristic of the battery 50 that is found as follows. That is, a plurality of combinations of a battery capacity Cb of the battery 50 obtained by time-integration of the charge/discharge current Ib and an inter-terminal voltage Vb of the battery 50 are plotted in a graph in which the battery capacity Cb is represented by the X axis and the inter-terminal voltage Vb is represented by the Y axis, and using the data, the slope (discharge characteristic) of the plotted curve is found by the least-squares method or the like, and the amount of change in the discharge characteristic is determined as the degradation degree value D.

Figure 11:
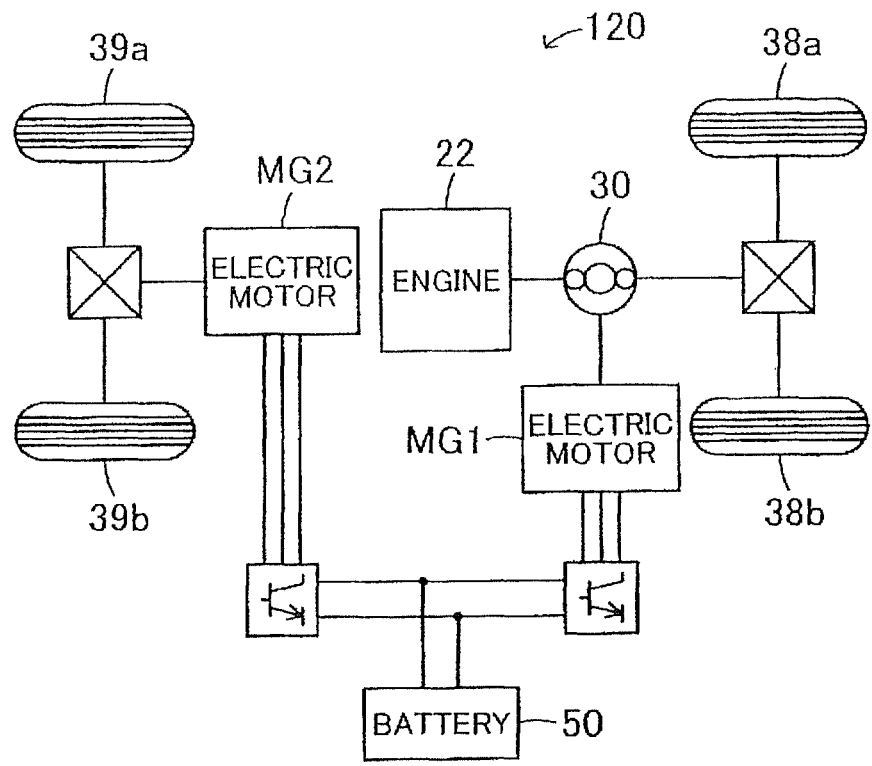
FIG. 11 is a construction diagram showing a general construction of a hybrid motor vehicle according a modification of the embodiment.

As exemplified in a hybrid motor vehicle 120 according to a modification shown in FIG. 11, motive power from the electric motor MG2 may be output to axles (i.e., axles connected to wheels 39a and 39b in FIG. 11) that are different from axles connected to the drive shaft 36 (i.e., axles connected to the driving wheels 38a and 38b).

Figure 12:
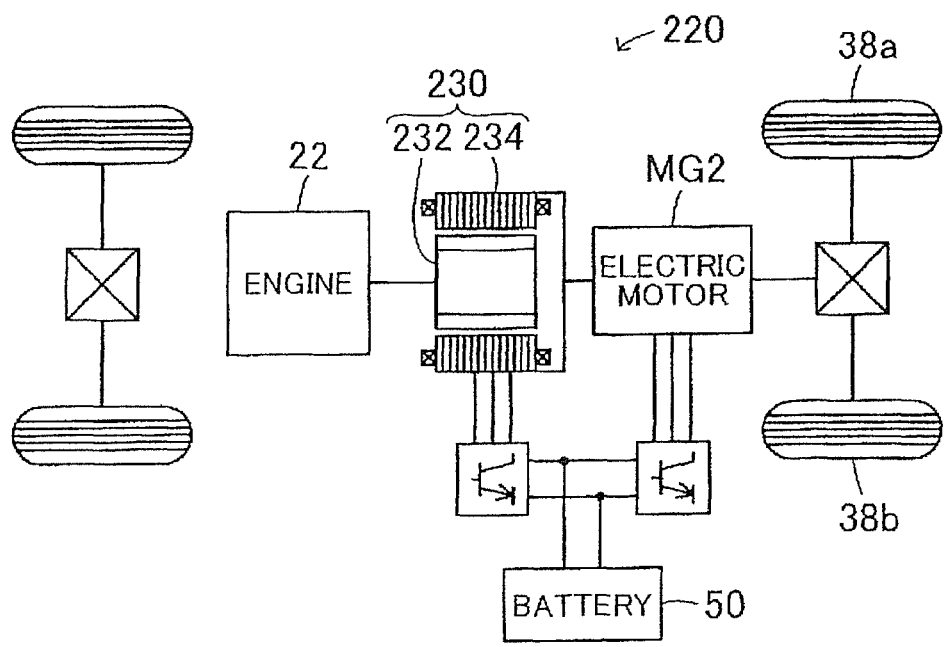
FIG. 12 is a construction diagram showing a general construction of a hybrid motor vehicle according to another modification.

As exemplified in a hybrid motor vehicle 220 according to another modification in FIG. 12, a pair-rotor motor-generator 230 may be provided. The pair-rotor motor-generator 230 has an inner rotor 232 that is connected to the crankshaft of the engine 22 and an outer rotor 234 that is connected to the drive shaft 36 that outputs motive power to the driving wheels 38a and 38b, and transfers a part of the motive power from the engine 22 to the drive shaft 36 and converts the remainder motive power into electric power.

Figure 13:
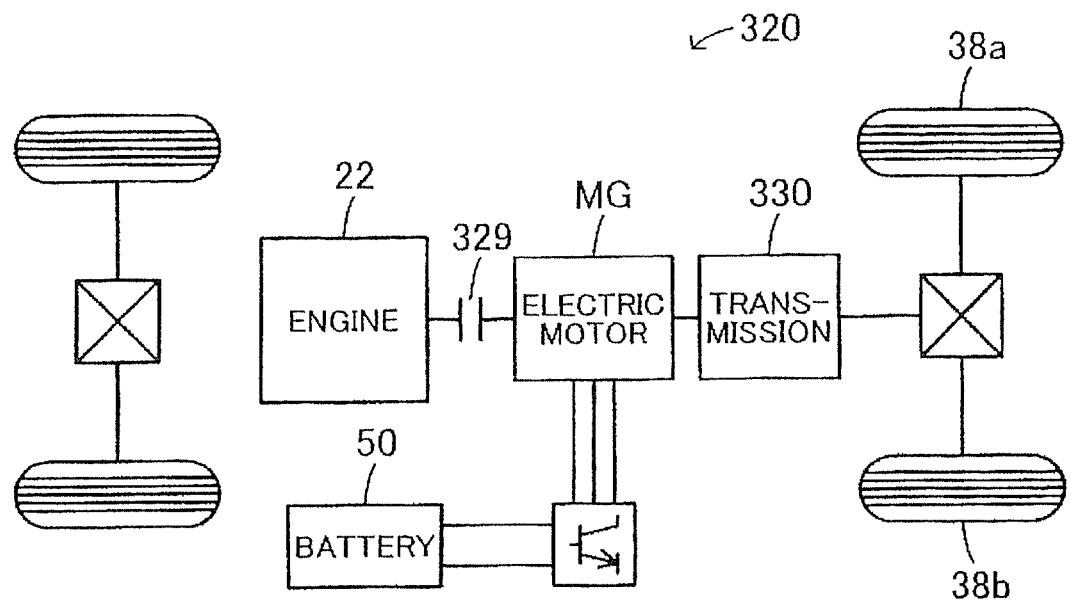
FIG. 13 is a construction diagram showing a general construction of a hybrid motor vehicle according to still another modification.
Figure 14:
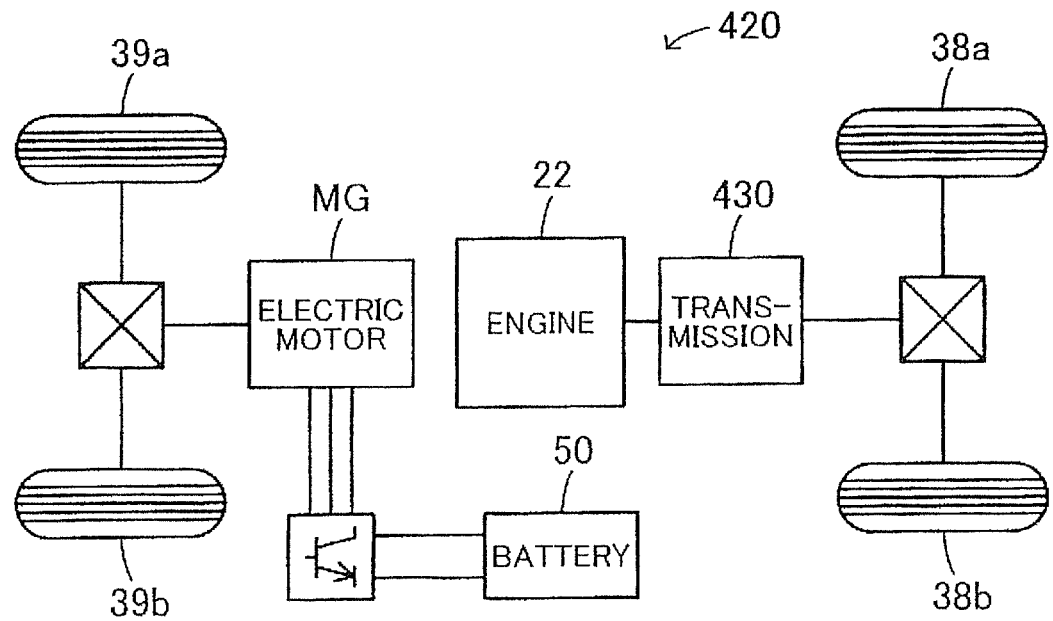
FIG. 14 is a construction diagram showing a general construction of a hybrid motor vehicle according to a further modification.

It is also permissible to adopt a construction exemplified in a hybrid motor vehicle 320 according to still another modification in FIG. 13. That is, an electric motor MG is attached, via a transmission 330, to the drive shaft 36 that is connected to the driving wheels 38a and 38b, and the rotating shaft of the electric motor MG is connected to the engine 22 via a clutch 329. Motive power from the engine 22 is output to the drive shaft 36 via the rotating shaft of the electric motor MG and the transmission 330, and motive power from the electric motor MG is output to the drive shaft via the transmission 330. Alternatively, a construction exemplified in a hybrid motor vehicle 420 according to a further modification in FIG. 14 may be adopted. That is, motive power from the engine 22 is output to the drive shaft 36 connected to the driving wheels 38a and 38b via a transmission 430, and motive power from the electric motor MG is output to axles that are different from the axles connected to the driving wheels 38a and 38b (i.e., axles connected to wheels 39a and 39b in FIG. 14).

Correspondence relations between main elements of the embodiment and main elements of the invention described in the foregoing section of SUMMARY OF THE INVENTION will be described. In the embodiment, the engine 22 corresponds to an "engine" in the invention, and the electric motor MG2 corresponds to an "electric motor", and the battery 50 corresponds to a "battery". A combination of the HVECU 70 that executes the drive control routine shown in FIGS. 2A and 2B and the control-purpose value setting routine shown in FIG. 7, the engine ECU 24 that receives the target rotation speed Ne* and the target torque Te* of the engine 22 from the HVECU 70 and controls the engine 22, and the electric motor ECU 40 that receives the torque commands Tm1* and Tm2* of the electric motors MG1 and MG2 from the HVECU 70 and controls the electric motors MG1 and MG2 corresponds to a "controller" in the invention.

It is to be noted herein that the "engine" in the invention is not limited to the engine 22 that outputs motive power by using gasoline, light oil, etc. as fuel, but may be any type of engine, such as a hydrogen engine or the like, as long as the engine is capable of outputting motive power for running the vehicle. The "electric motor" in the invention is not limited to the electric motor MG2 configured as a synchronous generator-motor, but may be any type of electric motor, such as an induction electric motor or the like, as long as the electric motor is capable of taking in and outputting motive power for running the vehicle. The "battery" in the invention is not limited to the battery 50 configured as a lithium ion secondary cell, but may be any type of battery, such as a nickel metal hydride secondary battery, a nickel-cadmium secondary battery, a lead storage battery, etc., as long as the battery is capable of receiving electric power from and giving electric power to an electric motor. The "controller" in the invention is not limited to combinations of the HVECU 70, the engine ECU 24, the electric motor ECU 40 and the battery ECU 52, but may also be a controller composed of a single electronic control unit, or the like. Furthermore, the "controller" in the invention is not limited to a controller that sets the engine start threshold value Pstart and the engine stop threshold value Pstop smaller when the degradation degree value D, which indicates the degree of degradation of the battery 50, exceeds the permissible upper limit value Dref than when the degradation degree value D is less than or equal to the permissible upper limit value Dref, but any controller that performs the following controls may be employed. The engine and the electric motor are controlled so that when the required power required of the vehicle on the basis of the required torque that is required at the time of running the vehicle during stop of operation of the engine becomes equal to or greater than the engine start threshold value, the vehicle runs by the required torque while the engine outputs the required power until the required power decreases to or below an engine stop threshold value that is smaller than an engine start threshold value. If during operation of the engine, the required power decreases to or below the engine stop threshold value, the electric motor is controlled so that the vehicle runs by the required torque while the engine is in the stopped state, until the required power increases to or above the engine start threshold value. The engine stop threshold value is set so as to be smaller when the degree of degradation of the battery exceeds a threshold value than when the degree of degradation of the battery is less than or equal to the threshold value.

Incidentally, correspondence relations between main elements of the embodiment and main elements of the invention described in the section of SUMMARY OF THE INVENTION do not limit the elements of the invention described in SUMMARY OF THE INVENTION since the embodiment is an example for concretely illustrating a form for carrying out the invention described in SUMMARY OF THE INVENTION. That is, interpretation of the invention described in the section of SUMMARY OF THE INVENTION should be carried out on the basis of what is described in that section, and the embodiment and the like are mere concrete examples of the invention described in SUMMARY OF THE INVENTION.

It is apparent that the invention is not limited to the embodiment or the like in any manner, but can be carried out in various forms without departing from the gist of the invention.

The invention is applicable in an industry that manufactures hybrid motor vehicles, etc.

What is claimed is:

1. A hybrid motor vehicle comprising:
    an engine configured to output motive power for running the hybrid motor vehicle;
    an electric motor configured to take in and output motive power for running the hybrid motor vehicle;
    a battery configured to give electric power to and receive electric power from the electric motor; and
    a controller configured to
    control the engine and the electric motor so that when a required power required of the hybrid motor vehicle based on required torque needed to run the hybrid motor vehicle increases to or above a first threshold value during stop of operation of the engine, the hybrid motor vehicle runs by the required torque while the engine outputs the required power, until the required power decreases to or below a second threshold value that is smaller than the first threshold value,
    control the engine and the electric motor so that when the required power decreases to or below the second threshold value during operation of the engine, the hybrid motor vehicle runs by the required torque while the engine is in a stopped state, until the required power increases to or above the first threshold value, and
    set the second threshold value so that the second threshold value is smaller when degree of degradation of the battery exceeds a threshold value than when the degree of degradation of the battery is less than or equal to the threshold value.

2. The hybrid motor vehicle according to claim 1, wherein the controller sets the second threshold value so that the second threshold value is smaller as the degree of degradation of the battery is greater above the threshold value.

3. The hybrid motor vehicle according to claim 1, wherein the controller sets the first threshold value so that the first threshold value is smaller when the degree of degradation of the battery exceeds the threshold value than when the degree of degradation of the battery is less than or equal to the threshold value.

4. The hybrid motor vehicle according to claim 3, wherein the controller sets the first threshold value so that the first threshold value is smaller as the degree of degradation of the battery is greater above the threshold value.

5. The hybrid motor vehicle according to claim 1, wherein the controller sets the required power based on the required torque and on charge/discharge required power of the battery, and sets the charge/discharge required power so that the charge/discharge required power is smaller in absolute value when the degree of degradation of the battery exceeds the threshold value than when the degree of degradation of the battery is less than or equal to the threshold value.

6. The hybrid motor vehicle according to claim 1, wherein the controller computes the degree of degradation of the battery by dividing amount of change in charge storage ratio of the battery over a predetermined time by an integrated value of the charge/discharge electric power of the battery over the predetermined time.

7. The hybrid motor vehicle further according to claim 1, further comprising:
    an electricity generator configured to give electric power to and receive electric power from the battery; and
    a planetary gear including three rotating elements connected to a drive shaft linked to an axle, an output shaft of the engine and a rotating shaft of the electricity generator, respectively,
    wherein the rotating shaft of the electric motor is connected to the drive shaft.

* * * * *